US012312445B2

(12) United States Patent
Joffre et al.

(10) Patent No.: US 12,312,445 B2
(45) Date of Patent: May 27, 2025

(54) BRANCHED ORGANOSILANOL COMPOUNDS AND METHODS FOR THE PREPARATION AND USE THEREOF

(71) Applicants: Dow Silicones Corporation, Midland, MI (US); Dow Global Technologies LLC, Midland, MI (US)

(72) Inventors: Eric Joffre, Midland, MI (US); Xiaoyuan Zhou, Midland, MI (US); John Roberts, Midland, MI (US)

(73) Assignees: Dow Global Technologies LLC, Midland, MI (US); Dow Silicones Corporation, Midland, MI (US)

( * ) Notice: Subject to any disclaimer, the term of this patent is extended or adjusted under 35 U.S.C. 154(b) by 465 days.

(21) Appl. No.: 17/799,326

(22) PCT Filed: Mar. 24, 2021

(86) PCT No.: PCT/US2021/023851
§ 371 (c)(1),
(2) Date: Aug. 12, 2022

(87) PCT Pub. No.: WO2021/221832
PCT Pub. Date: Nov. 4, 2021

(65) Prior Publication Data
US 2023/0103096 A1 Mar. 30, 2023

Related U.S. Application Data

(60) Provisional application No. 63/017,689, filed on Apr. 30, 2020.

(51) Int. Cl.
| | | |
|---|---|---|
| *C08G 77/48* | (2006.01) | |
| *C07F 7/08* | (2006.01) | |
| *C08G 77/16* | (2006.01) | |
| *C08G 77/18* | (2006.01) | |
| *C08G 77/38* | (2006.01) | |
| *C08G 77/50* | (2006.01) | |

(52) U.S. Cl.
CPC .......... *C08G 77/485* (2013.01); *C07F 7/0896* (2013.01); *C08G 77/16* (2013.01); *C08G 77/18* (2013.01); *C08G 77/38* (2013.01); *C08G 77/50* (2013.01)

(58) Field of Classification Search
CPC ...... C08G 77/16; C08G 77/18; C08G 77/485; C08G 77/50
See application file for complete search history.

(56) References Cited

U.S. PATENT DOCUMENTS

| | | |
|---|---|---|
| 4,742,177 A | 5/1988 | Yamamoto et al. |
| 5,457,220 A | 10/1995 | Razzano |
| 5,484,950 A | 1/1996 | Crivello |
| 6,013,753 A | 1/2000 | Krahnke et al. |
| 6,127,502 A * | 10/2000 | Krahnke ................. C08G 77/50 528/10 |
| 6,265,518 B1 * | 7/2001 | Krahnke ................... C07F 7/12 556/451 |
| 8,076,411 B2 | 12/2011 | Maton et al. |
| 8,580,862 B2 | 11/2013 | Barnes et al. |
| 9,051,428 B2 | 6/2015 | Davio et al. |
| 9,475,968 B2 | 10/2016 | Hammond et al. |

FOREIGN PATENT DOCUMENTS

| | | |
|---|---|---|
| EP | 0733637 A1 | 9/1996 |
| EP | 1013653 A2 | 6/2000 |
| JP | H1180315 A | 3/1999 |
| JP | H11158232 A | 6/1999 |
| JP | 2012121950 A | 6/2012 |
| JP | 2013185066 A | 9/2013 |
| RU | 2277106 C1 | 5/2006 |
| WO | 2008088523 A1 | 7/2008 |
| WO | 2018004797 A1 | 1/2018 |

OTHER PUBLICATIONS

Chang, "Stepwise synthesis of siloxane chains", Chemical Communications 2, 2004, pp. 206-207.
Barton, "Comments on the formation of silanones in the thermolysis of hydridosilyl peroxides", Organometallics 1.5, 1982, pp. 721-725.
Search Report from Chinese Application No. 201980085467.1 dated Mar. 15, 2023.
Aliaga-Lavrijsen, "Hydrolysis and Methanolysis of Silanes Catalyzed by Iridium(III) Bis-N-Heterocyclic Carbene Complexes: Influence of the Wingtip Groups." American Chemical Society. 2014, p. 2378-2385.
Azumanyan, "Aerobic Co or Cu/NHPI-catalyzed oxidation of hydride siloxanes: synthesis of siloxanols." The Royal Society of Chemistry. 2018, p. 1467-1471.
Barak, "Ruthenacyclic Carbamoyl Complexes: Highly Efficient Catalysts for Organosilane Hydrolysis." Eur. J. Inorg. Chem. 2018, p. 4982-4986, Europe.
Cai, "Synthesis of novel polymethacrylates with siloxyl bridging perfluoroalkyl side-chains for hydrophobic application on cotton fabrics." 2015, p. 1-15.
Lee, "Highly Efficient Iridium-Catalyzed Oxidation of Organosilanes to Silanos." American Chemical Society. J. Org. Chem. 2004, p. 1741-1743, vol. 69.
Lee, "Highly Selective and Practical Hydrolytic Oxidation of Organosilanes to Silanols Catalyzed by a Ruthenium Complex." American Chemical Society. J. Am. Chem Soc. 2000, p. 12011-12012.
Li, "Catalytic Cross-Dehydrocoupling Polymerization of 1,4-Bis(dimethylsilyl)benzene with Water. A New Approach to Poly(oxydimethylsilylene)-(1,4-phenylene)(dimethylsilylene)." American Chemical Society. Macromolecules. 1999, p. 3540-3542, vol. 32, No. 10.

(Continued)

*Primary Examiner* — Marc S Zimmer
(74) *Attorney, Agent, or Firm* — Catherine U. Brown

(57) ABSTRACT

A branched organosilanol compound and method for its preparation are provided. The branched organosilanol compound may be used as a starting material in a method for preparing a functionalized polymer.

15 Claims, 5 Drawing Sheets

(56) References Cited

OTHER PUBLICATIONS

Lickiss, "The Synthesis and Structure of Organosilanols." Advances in Inorganic Chemistry. 1995, p. 147-262, vol. 42.
Lin, "Wettaility-Driven Palladium Catalysis for Enhanced Dehydrogenative Coupling of Organosilanes." American Chemical Society. ASC Catal. 2017, p. 1720-1727, vol. 7.
Rettig, "Tellurorhodamine photocatalyzed aerobic oxidation of organosilanes and phosphines by visible-light." The Royal Society of Chemistry. Dalton Trans. 2019, p. 5665-5673, vol. 48.
Tan, "Catalytic Hydrogen Generation from the Hydrolysis of Silanes by Ruthenium Complexes." American Chemical Society. 2011, p. 4008-4013, vol. 30.
Yu, "Highly Efficient Generation of Hydrogen from the Hydrolysis of Silanes Catalyzed by [RhCl(CO)2]2." American Chemical Society. Inorg. Chem. 2013, p. 10741-10743, vol. 52.

* cited by examiner

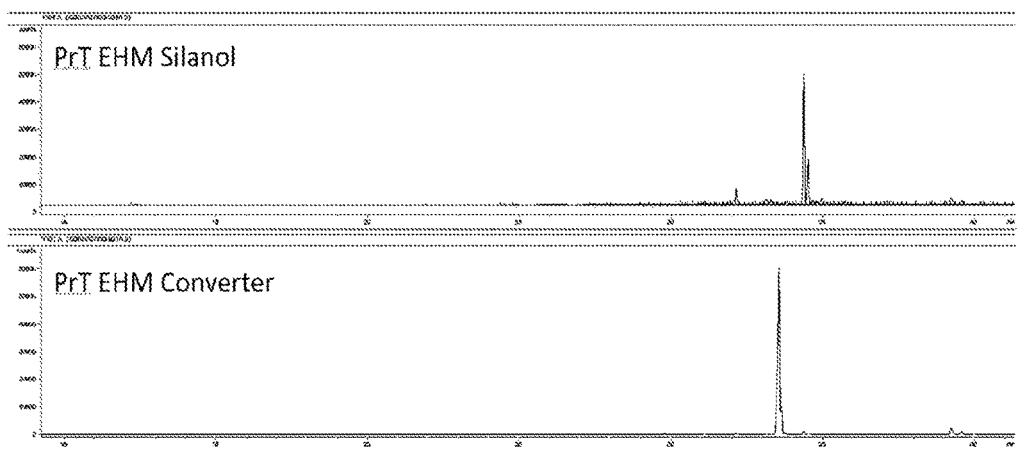
Figure 1. GC of PrT EHM converter and PrT EHM silanol.
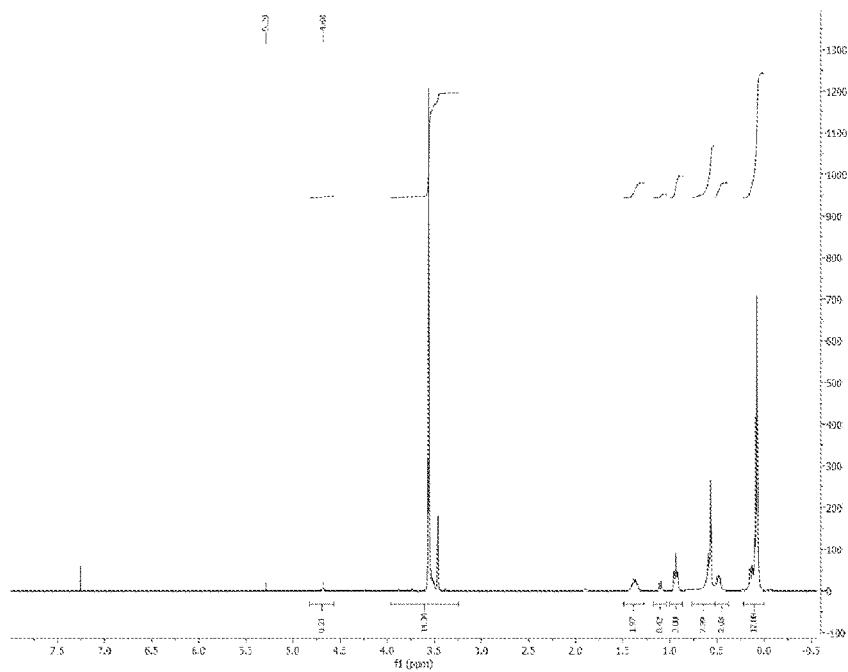
Figure 2. $^1$H NMR of PrT EHM silanol.

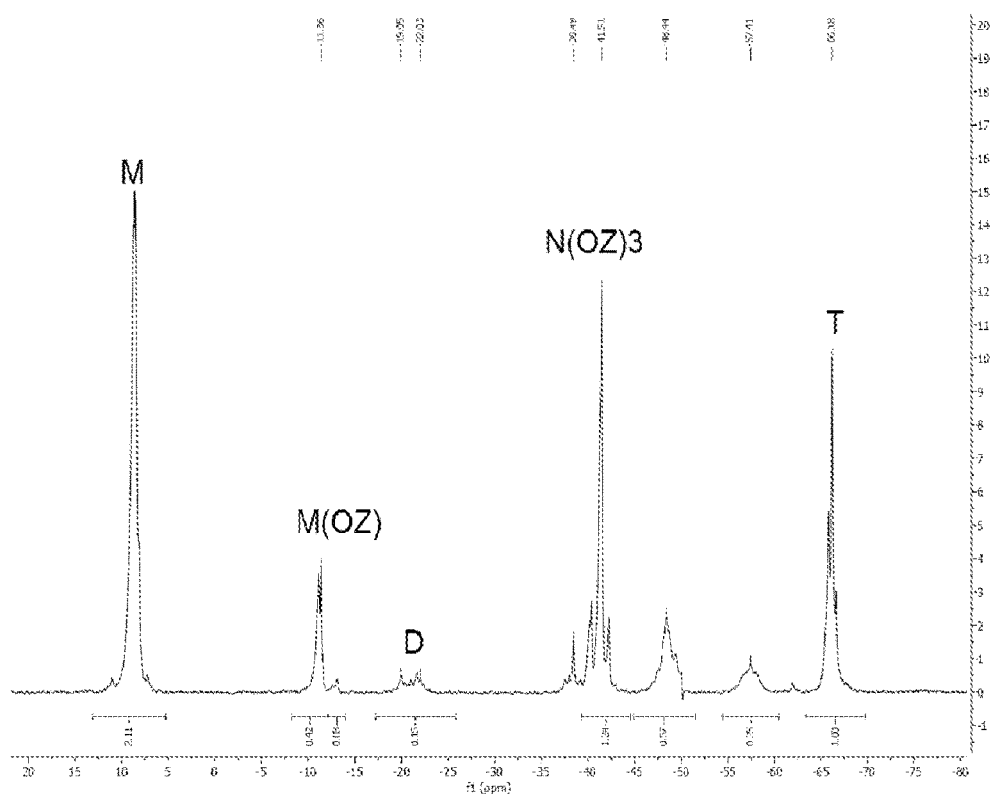
Figure 3. $^{29}$Si NMR of PrT EHM silanol.
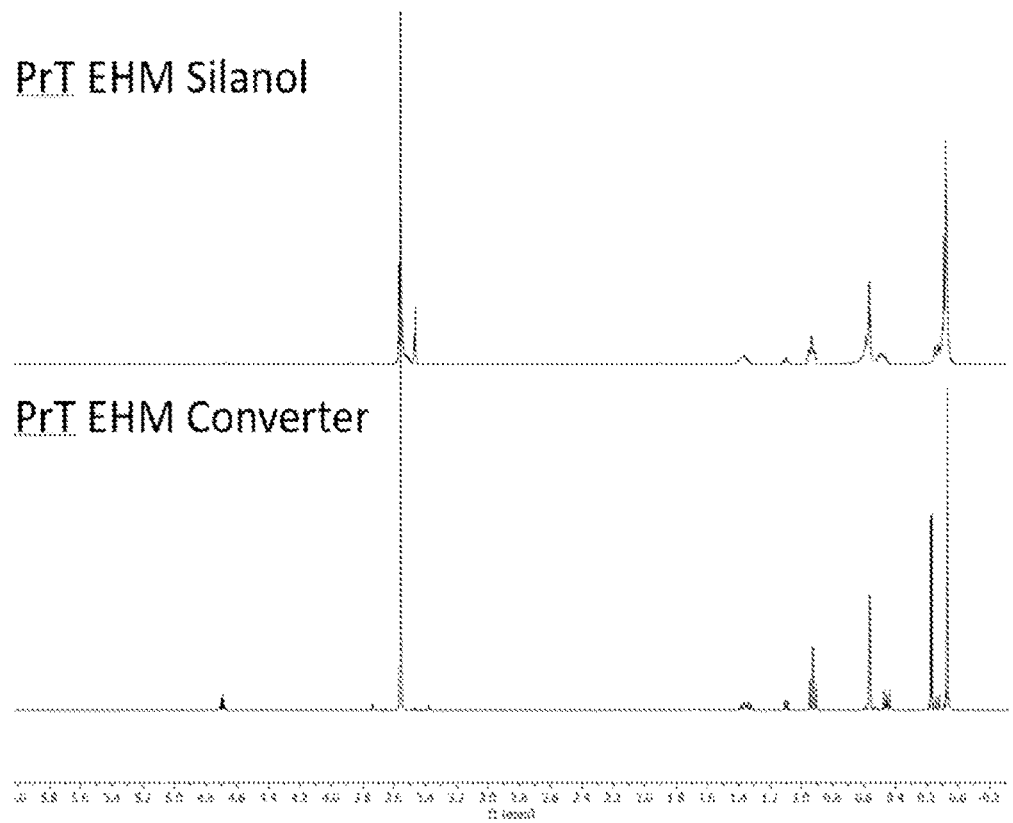
Figure 4. Comparison of PrT EHM converter and PrT EHM silanol in $^1$H NMR.

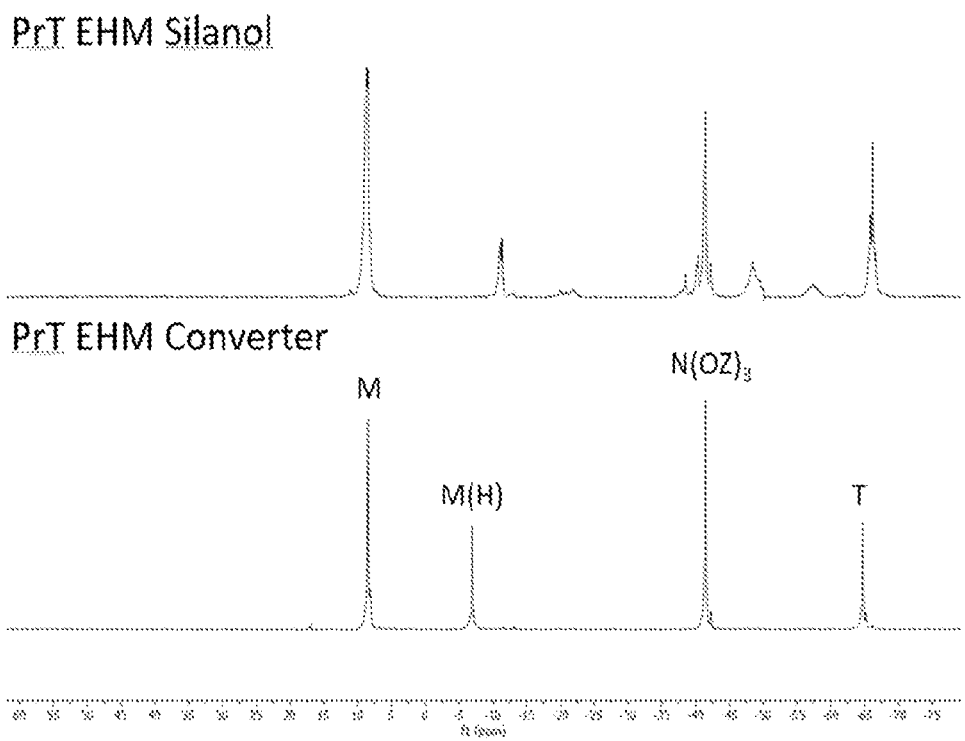
Figure 5. Comparison of PrT EHM converter and PrT EHM silanol in $^{29}$Si NMR.
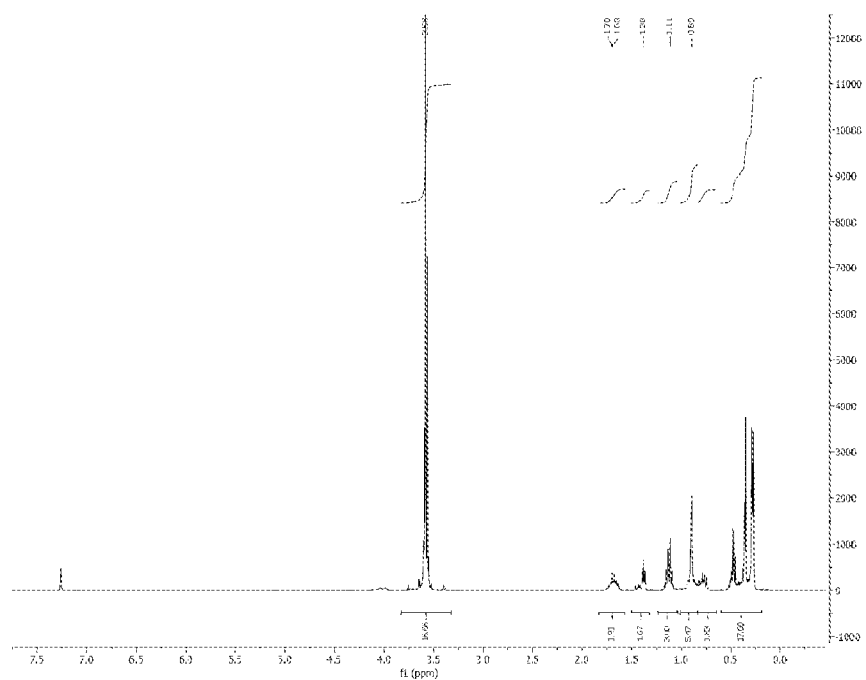
Figure 6. $^1$H NMR of PrT EHM silanol.

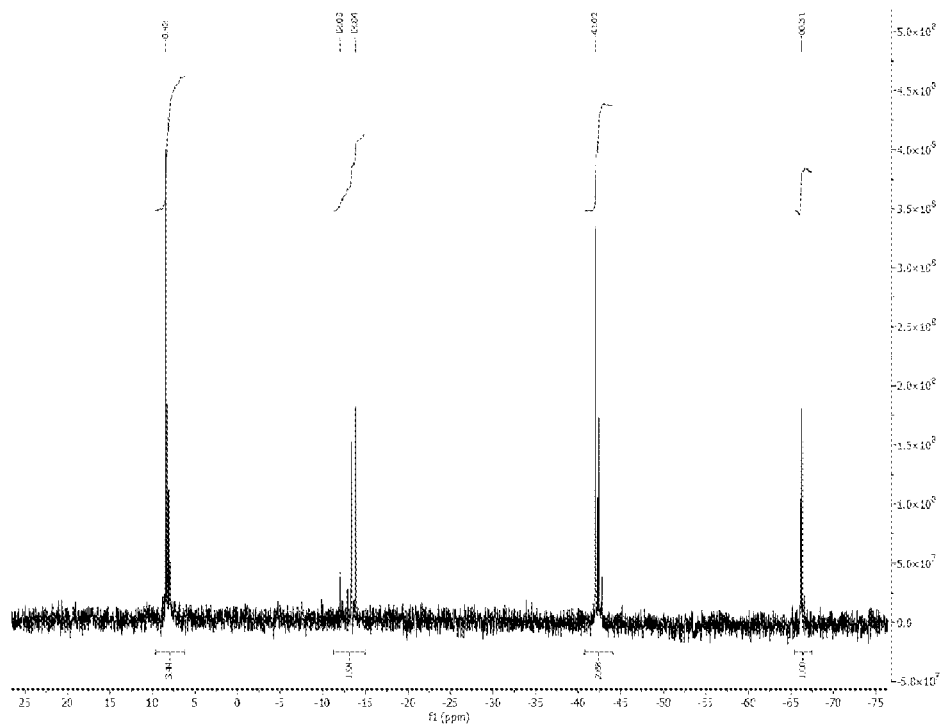
Figure 7. $^{29}$Si NMR of PrT EHM silanol.
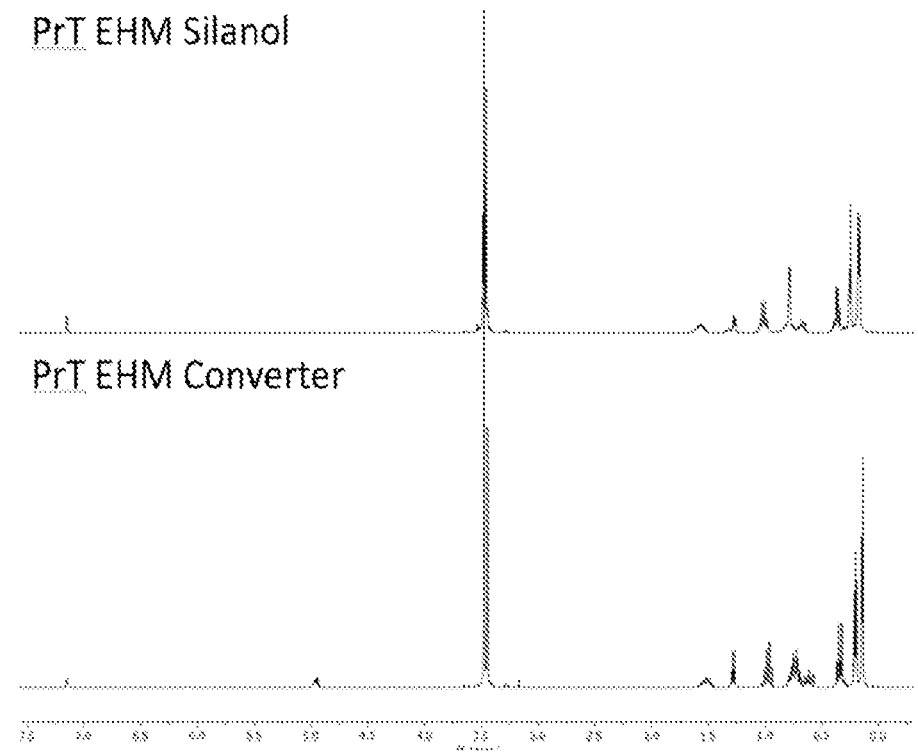
Figure 8. Comparison of PrT EHM converter and PrT EHM silanol in $^1$H NMR.

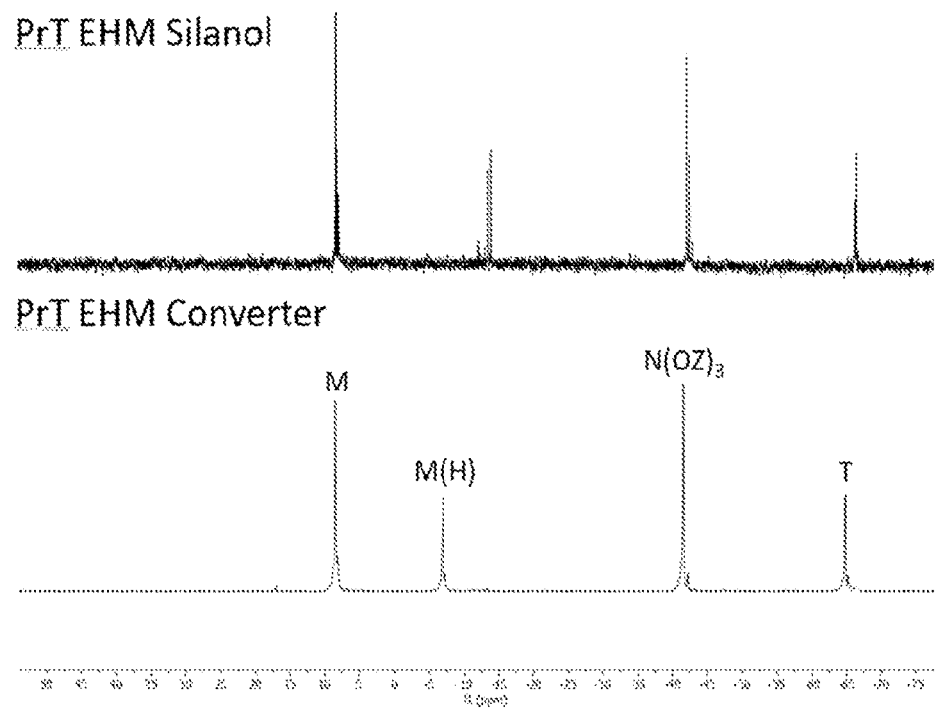
Figure 9. Comparison of PrT EHM converter and PrT EHM silanol in $^{29}$Si NMR.
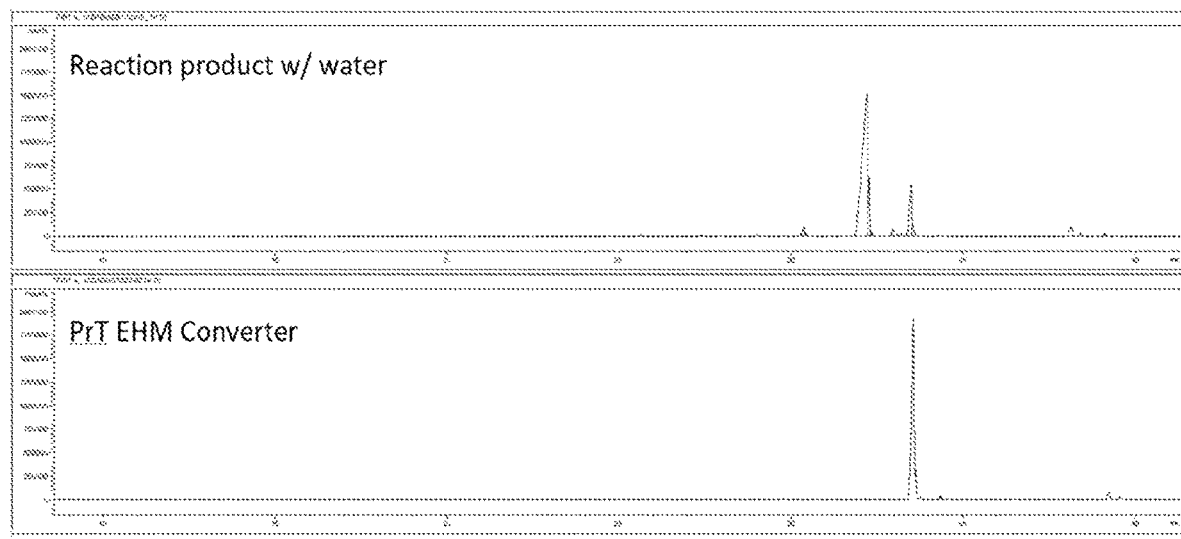
Figure 10. GC of PrT EHM converter and the reaction product with water in the presence of [Ru(p-cymene)Cl$_2$]$_2$.

BRANCHED ORGANOSILANOL COMPOUNDS AND METHODS FOR THE PREPARATION AND USE THEREOF

CROSS REFERENCE TO RELATED APPLICATIONS

This application is a U.S. national stage filing under 35 U.S.C. § 371 of PCT Application No. PCT/US21/023851 filed on 24 Mar. 2021, currently pending, which claims the benefit of U.S. Provisional Patent Application No. 63/017,689 filed 30 Apr. 2020 under 35 U.S.C. § 119 (e). PCT Application No. PCT/US21/023851 and U.S. Provisional Patent Application No. 63/017,689 are each hereby incorporated by reference.

TECHNICAL FIELD

This invention generally relates to an organosilicon compound. More specifically, this invention relates to a method of preparing a branched organosilanol compound, and the branched organosilanol compound prepared thereby. This invention further relates to a method of use of the branched organosilanol compound. More specifically, this invention relates to a method of preparing a functionalized polymer, such as a functionalized polyorganosiloxane and/or a silicone-organic hybrid copolymer, using the branched organosilanol as a starting material.

BACKGROUND

Organosilicon compounds are known in the art and are utilized in myriad end use applications and environments. For example, polyorganosiloxanes are utilized in numerous industrial, home care, and personal care formulations. Increasingly, hybrid materials having both silicone and organic functionality are utilized in such formulations, as such hybrid materials may exhibit combined benefits traditionally associated with only silicone materials or organic materials. However, many methods of preparing hybrid materials require functional organosilicon compounds, which are often difficult to synthesize and/or utilize. In particular, traditional methods of preparing certain functional organosilicon compounds are often incompatible with many silicone materials (e.g. via promoting silicone rearrangements, unselective reactions, degradation, hydrolysis of functional groups, etc.), resulting in decreased yields and purities, and limiting general applicability of such methods.

SUMMARY

A branched organosilanol compound is provided. The branched organosilanol compound may comprise a formula selected from the group consisting of:

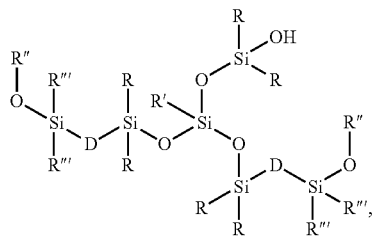
(I)

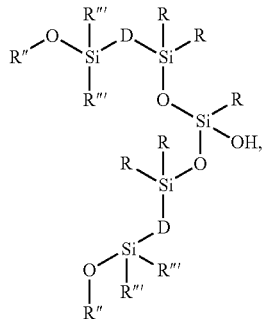
(II)

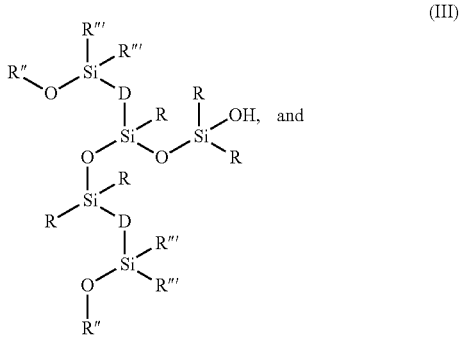
(III)

and (IV) a combination of any two or more of (I), (II), and (III), where each R, each R', and each R" is an independently selected monovalent hydrocarbyl group, each R''' is independently selected from the group consisting of R and OR", and each D is an independently selected divalent hydrocarbyl group.

A method of preparing the branched organosilanol compound described above is also provided. This method may comprise:

reacting (A) an initial organosilicon compound and (B) water in the presence of (C) a catalyst selected from the group consisting of (C-1) [($C_8H_{12}$)IrX]$_2$, where each X is an independently selected halogen atom; and (C-2) Pd/C, thereby preparing the organosilanol compound;

wherein the initial organosilicon compound (A) has a formula selected from the group consisting of:

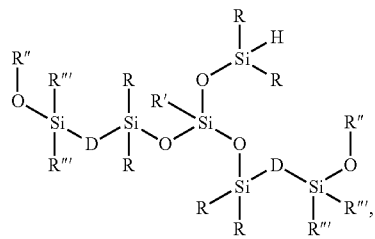
(A-1)

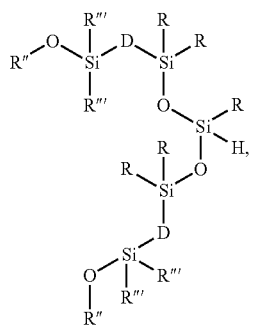

(A-2)

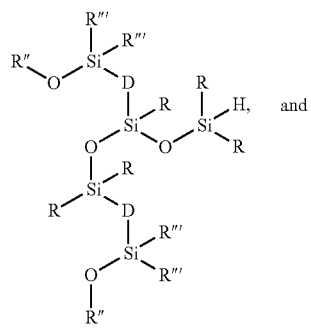

(A-3)

and (A-4) a combination of two or more of (A-1), (A-2), and (A-3), where R, R', R", and R''' are as defined above.

BRIEF DESCRIPTION OF THE FIGURES

FIG. 1 shows a Gas Chromtography trace of PrT EHM converter and PrT EHM silanol.

FIG. 2 shows a $^1$H NMR spectrum of PrT EHM silanol.

FIG. 3 shows a $^{29}$Si NMR spectrum of PrT EHM silanol.

FIG. 4 shows a comparison of PrT EHM converter and PrT EHM silanol in $^1$H NMR.

FIG. 5 shows a comparison of PrT EHM converter and PrT EHM silanol in $^{29}$Si NMR.

FIG. 6 shows a $^1$H NMR spectrum of PrT EHM silanol.

FIG. 7 shows a $^{29}$Si NMR spectrum of PrT EHM silanol.

FIG. 8 shows a comparison of PrT EHM converter and PrT EHM silanol in $^1$H NMR.

FIG. 9 shows a comparison of PrT EHM converter and PrT EHM silanol in $^{29}$Si NMR.

FIG. 10 shows a gas chromatography trace of PrT EHM converter and the reaction product with water in the presence of [Ru(p-cymene)Cl$_2$]$_2$.

DETAILED DESCRIPTION

A method for preparing a branched organosilanol compound comprises reacting (A) an initial organosilicon compound and (B) water in the presence of (C) a catalyst. The catalyst (C) is selected from the group consisting of: (C1) [(C$_8$H$_{12}$)IrX]$_2$, where each X is independently selected from the group consisting of Cl, Br, and I; and (C2) Pd/C.

Initial Organosilicon Compound (A)

The initial organosilicon compound (A) may have a formula selected from the group consisting of:

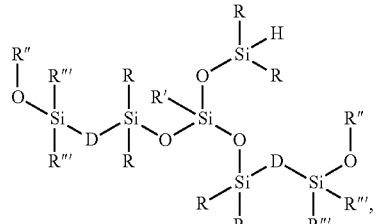

(A-1)

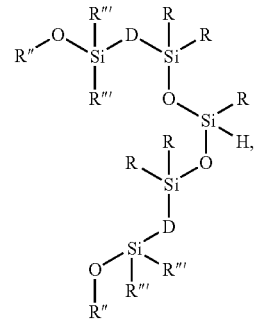

(A-2)

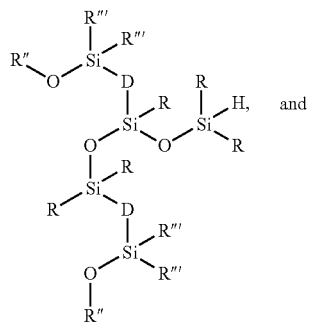

(A-3)

and (A-4) a combination of two or more of (A-1), (A-2), and (A-3), where each R, each R', and each R" is an independently selected monovalent hydrocarbyl group, each R''' is independently selected from the group consisting of R and OR", and each D is an independently selected divalent hydrocarbyl group. Suitable monovalent hydrocarbyl groups for R, R', and R" are exemplified by alkyl groups, alkenyl groups, and aryl groups. Examples of suitable alkyl groups include methyl, ethyl, propyl (e.g. iso-propyl and/or n-propyl), butyl (e.g. isobutyl, n-butyl, tert-butyl, and/or sec-butyl), pentyl (e.g., isopentyl, neopentyl, and/or tert-pentyl), hexyl, as well as branched saturated hydrocarbon groups having from 6 to 18 carbon atoms. Examples of suitable aryl groups include phenyl, tolyl, xylyl, naphthyl, benzyl, and dimethyl phenyl. Examples of suitable alkenyl groups include vinyl, allyl, propenyl, isopropenyl, butenyl, isobutenyl, pentenyl, heptenyl, hexenyl, and cyclohexenyl groups. Alternatively, each R may be an alkyl group of 1 to 18 carbon atoms or an aryl group of 6 to 18 carbon atoms. Alternatively, each R' may be an alkyl group of 1 to 18 carbon atoms. Alternatively, each R" may be an alkyl group of 1 to 6 carbon atoms. Alternatively, each R may be an alkyl group, such as methyl, ethyl or propyl; alternatively methyl. Alternatively, each R' may be methyl, ethyl or propyl;

alternatively propyl. Alternatively, each R'' may be methyl or ethyl; alternatively methyl. Alternatively, at least two of R''' per molecule may be OR'', and alternatively each R''' may be OR''. Alternatively, each R''' may be methoxy or ethoxy.

Suitable divalent hydrocarbon groups for D include alkylene groups such as ethylene (—CH$_2$—CH$_2$—), propylene such as —CH$_2$—CH$_2$—CH$_2$— or —CH(CH$_3$)CH$_2$—), butylene, or hexylene; an arylene group such as phenylene, or an alkarylene group such as:

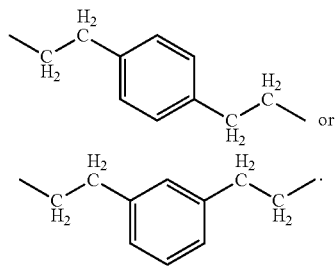

Alternatively, D may be an alkylene group of 2 to 6 carbon atoms, such as ethylene or propylene.

Alternatively, the initial organosilicon compound (A-1) may have formula:

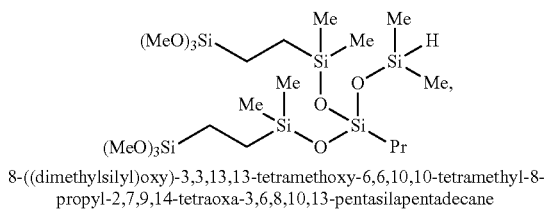

8-((dimethylsilyl)oxy)-3,3,13,13-tetramethoxy-6,6,10,10-tetramethyl-8-propyl-2,7,9,14-tetraoxa-3,6,8,10,13-pentasilapentadecane which may be abbreviated PrT EHM converter.

Alternatively, the initial organosilicon compound (A-2) may have formula

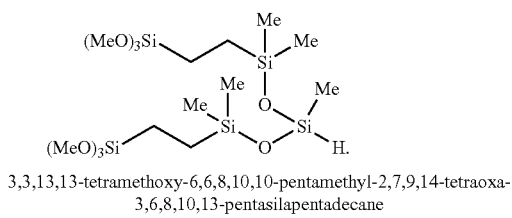

3,3,13,13-tetramethoxy-6,6,8,10,10-pentamethyl-2,7,9,14-tetraoxa-3,6,8,10,13-pentasilapentadecane Alternatively, the initial organosilicon compound (A-3) may have formula

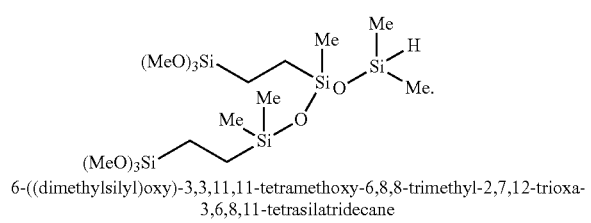

6-((dimethylsilyl)oxy)-3,3,11,11-tetramethoxy-6,8,8-trimethyl-2,7,12-trioxa-3,6,8,11-tetrasilatridecane The initial organosilicon compound (A) may be utilized in any form, such as neat (i.e., absent carrier vehicles, such as solvents and/or diluents), or disposed in a carrier vehicle, such as a solvent or diluent. The carrier vehicle, if present, may comprise an organic solvent (e.g. aromatic hydrocarbons such as benzene, toluene, and/or xylene; aliphatic hydrocarbons such as heptane, hexane, and/or octane; halogenated hydrocarbons such as dichloromethane, 1,1,1-trichloroethane, and/or chloroform; ethers such as diethyl ether and/or tetrahydrofuran), a silicone fluid, or combinations thereof. Alternatively, the method may be carried out in the presence of a carrier vehicle comprising a polar component, such as an ether, acetonitrile, dimethylformamide, dimethylsulfoxide, or combinations thereof. Alternatively, the carrier vehicle may comprise a halogenated hydrocarbon, such as those described above. The carrier vehicle in general, and/or the halogenated hydrocarbon in particular, may be purified and/or processed to reduce, alternatively to remove, any hydrochloric acid (HCl) therefrom. It will be appreciated that the initial organosilicon compound (A) may be combined with the carrier vehicle prior to, during, or after being combined with the water (B) and the catalyst (C).

Alternatively, the method for making the branched organosilanol compound described above may be performed in the absence of carrier vehicles that are reactive with the initial organosilicon compound (A) and/or the catalyst (C). For example, the method may comprise stripping a mixture of the initial organosilicon compound (A) of volatiles and/or solvents (e.g. water and/or reactive solvents). Techniques for stripping the initial organosilicon compound (A) are known in the art, and may include heating, drying, applying reduced pressure/vacuum, azeotroping with solvents, utilizing molecular sieves, and combinations thereof.

The initial organosilicon compound (A) may be utilized in any amount, which will be selected by one of skill in the art, depending on various factors, e.g., the particular catalyst (C) selected, the reaction parameters employed, and the scale of the reaction (e.g. total amounts of initial organosilicon compound (A) to be converted and/or organosilanol compound to be prepared). The initial organosilicon compound (A) may be synthesized by known methods, such as those disclosed in U.S. Pat. No. 6,265,518 and EP1013653A2.

Water (B)

The water (B) is not generally limited, and may be utilized neat (i.e., absent any carrier vehicles/solvents), and/or pure (i.e., free from or substantially free from minerals and/or other impurities). For example, the water (B) may be processed or unprocessed prior to the reaction with the initial organosilicon compound (A). Examples of processes that may be used for purifying the water include distilling, filtering, deionizing, and combinations of two or more thereof, such that the water (B) may be deionized, distilled, and/or filtered. Alternatively, the water (B) may be unprocessed (e.g. may be tap water, i.e., provided by a municipal water system or well water, used without further purification). Alternatively, the water (B) may be purified before reaction with the initial organosilicon compound (A). Alternatively, the water (B) may be utilized as a mixture (e.g. solution or suspension) comprising a carrier vehicle/solvent, such as any of those listed above with respect to the initial organosilicon compound (A).

The water (B) may be utilized in any amount, which will be selected by one of skill in the art, depending on various factors, e.g., the particular catalyst (C) selected, the reaction parameters employed, the scale of the reaction (e.g. total amount of initial organosilicon compound (A) to be converted and/or organosilanol compound to be prepared).

The relative amounts of the initial organosilicon compound (A) and water (B) utilized may vary, e.g. based upon the particular initial organosilicon compound (A) selected, the particular catalyst (C) selected, and the reaction parameters employed. As understood by those of skill in the art, the hydrolysis of the initial organosilicon compound (A) with water (B) occurs at a molar ratio (A):(B) of 1:1 to 1:1.5. However, an excess of the one of these may be utilized to fully consume one of the initial organosilicon compound (A) or the water (B), e.g., to simplify purification of the reaction product formed. For example, in certain embodiments, water (B) is utilized in relative excess to maximize a conversion rate of the initial organosilicon compound (A) to the organosilanol compound.

Catalyst (C)

As introduced above, the catalyst (C) is selected from (C1) [$(C_8H_{12})$IrX]$_2$, where each X is independently selected from the group consisting of chlorine (Cl), bromine (Br) and iodine (I); and (C2) Pd/C. Alternatively, each X may be Cl. Alternatively, catalyst (C2) Pd/C may be utilized.

Methods of preparing catalysts (C1) and (C2) are well known in the art, with the catalysts and/or compounds used to prepare the same being commercially available from various suppliers. As such, the catalyst (C) may be prepared as part of the method, or otherwise obtained (i.e., as a prepared compound). Preparations of the catalyst (C) may be formed prior to the reaction of the initial organosilicon compound (A) and water (B), or in situ (i.e., during the reaction of (A) and (B)).

The catalyst (C) may be utilized in any form, such as neat (i.e., absent solvents, carrier vehicles, diluents), or disposed in a carrier vehicle, such as a solvent or dispersant (e.g. such as any of those listed above with respect to the initial organosilicon compound (A)). Alternatively, the catalyst (C) may be utilized in a form absent water and/or carrier vehicles/volatiles reactive with the initial organosilicon compound (A) and/or the catalyst (C) itself (i.e., until combined with the initial organosilicon compound (A) and/or the water (B). For example, the method may comprise stripping the catalyst (C) of volatiles and/or solvents (e.g. water and/or organic solvents). Techniques for stripping the catalyst (C) are known in the art, and may include heating, drying, applying reduced pressure/vacuum, azeotroping with solvents, utilizing an adsorbent such as molecular sieves, and combinations thereof.

The catalyst (C) may be utilized in any amount, which will be selected by one of skill in the art, depending on various factors, e.g., the particular catalyst (C) selected, the reaction parameters employed, the scale of the reaction (e.g. total amounts of the initial organosilicon compound (A) and the water (B)). The molar ratio of the catalyst (C) to the initial organosilicon compound (A) and/or the water (B) utilized in the reaction may influence the rate and/or amount of hydrolysis to prepare the organosilanol compound. Thus, the amount of the catalyst (C) as compared to (A) and/or (B), as well as the molar ratios therebetween, may vary. Typically, these relative amounts and the molar ratio are selected to maximize the hydrolysis of the initial organosilicon compound (A) to the organosilanol compound, while minimizing the loading of the catalyst (C) (e.g. for increased economic efficiency of the reaction, and/or increased ease of purification of the reaction product formed).

Alternatively, the catalyst (C) may be utilized in the reaction in an amount of from 0.001 to 10 mol % based on the total amount of the initial organosilicon compound (A) utilized. For example, the catalyst (C) may be used in an amount of 0.005 to 10, alternatively 0.005 to 5, alternatively 0.01 to 5, mol % based on the total amount of the initial organosilicon compound (A) utilized.

The reaction of the initial organosilicon compound (A) and water (B) to prepare the organosilanol compound is carried out in a vessel or reactor. When the reaction is carried out at an elevated or reduced temperature as described below, the vessel or reactor may be heated or cooled in any suitable manner, e.g. via a jacket, mantle, exchanger, bath, and/or coils.

Starting materials (A), (B), and (C), and optional any carrier vehicle, may be fed together or separately to the vessel, or may be disposed in the vessel in any order of addition, and in any combination. For example, starting materials comprising (B) and (C) may be added to a vessel containing starting materials comprising (A), and optionally carrier vehicle. In such embodiments, starting materials (B) and (C) may be first combined before addition, or may be added to the vessel sequentially (e.g. (C) then (B)). In general, reference to the "reaction mixture" herein refers generally to a mixture comprising starting materials (A), (B), and (C) (e.g. as obtained by combining such starting materials, as described above). Of course, when utilized, the carrier vehicle may also be included in the reaction mixture.

The method may further comprise agitating the reaction mixture. The agitating may enhance mixing and contacting together starting materials (A), (B), and (C) when combined, e.g. in the reaction mixture thereof. Such contacting independently may use other conditions, with (e.g. concurrently or sequentially) or without (i.e., independent from, alternatively in place of) the agitating. The other conditions may be tailored to enhance the contacting, and thus reaction (i.e., hydrolysis), of the initial organosilicon compound (A) with the water (B) to form the organosilanol compound. Other conditions may be result-effective conditions for enhancing reaction yield or minimizing amount of a particular reaction by-product included within the reaction product along with the organosilanol compound.

Alternatively, the reaction of the initial organosilicon compound (A) and the water (B) may be carried out in the presence of the carrier vehicle or solvent, such as one or more of those described above. For example, portions of carrier vehicle or solvent may be added to or otherwise combined with the initial organosilicon compound (A), water (B), and/or the catalyst (C) (i.e., when present) discretely, collectively with mixtures of starting materials (A), (B), and/or (C), or with the reaction mixture as a whole. The total amount of carrier vehicle/solvent present in the reaction mixture will be selected by one of skill in the art, e.g. based on the particular initial organosilicon compound (A) selected, the particular catalyst (C) selected, the reaction parameters employed).

The reaction may be performed at a reduced temperature. The reduced temperature will be selected and controlled depending on the particular organosilicon compound (A) selected, the particular catalyst (C) selected, the particular organosilanol compound being prepared, and combinations thereof. Accordingly, the reduced temperature will be readily selected by one of skill in the art in view of the reaction conditions and parameters selected and the description herein. The reduced temperature may be −78° C. to less than ambient temperature, such as from −30° C. to 25° C., alternatively from −15° C. to 25° C., alternatively from −10°

C. to 25° C., alternatively from −10° C. to 20° C., alternatively from −5° C. to 20° C. Alternatively, the reaction may be carried out at a temperature of 0° C.±5° C. (e.g. by use of a circulator or chiller using ice and/or a set point of 0° C.). Alternatively, the reaction may be performed at RT.

It is to be appreciated that the reaction temperature may also differ from the ranges set forth above. Likewise, it is also to be appreciated that reaction parameters may be modified during the reaction of the initial organosilicon compound (A) and the water (B). For example, temperature, pressure, and other parameters may be independently selected or modified during the reaction. Any of these parameters may independently be an ambient parameter (e.g., RT and/or atmospheric pressure) and/or a non-ambient parameter (e.g. reduced or elevated temperature and/or reduced or elevated pressure). Any parameter, may also be dynamically modified, modified in real time, i.e., during the method, or may be static (e.g. for the duration of the reaction, or for any portion thereof).

The time during which the reaction of the initial organosilicon (A) and the water (B) to prepare the organosilanol compound is carried out is a function of various factors including scale, reaction parameters and conditions, and selection of particular starting materials. The time during which the reaction is performed may be >0 to 48 hours, such as from 1 minute to 48 hours. On a relatively large scale (e.g. >1, alternatively >5, alternatively >10, alternatively >50, alternatively >100 kg), the reaction may be carried out for hours, such as 1 to 48, alternatively 2 to 36, alternatively 4 to 24, alternatively of 6, 12, 18, 24, 36, or 48 hours, as will be readily determined by one of skill in the art (e.g. by monitoring conversion of the initial organosilicon compound (A), and/or production of the organosilanol compound, such as via chromatographic and/or spectroscopic methods). On a relatively small scale (e.g. gram-scale, or <10, alternatively <5, alternatively <1, kg), the reaction may be carried out for a time of from 1 minute to 4 hours, such as from 1 minute to 1 hour, from 5 to 30 minutes, or for a time of 10, 15, or 20 minutes.

Reacting the initial organosilicon compound (A) and water (B) forms a reaction product comprising the branched organosilanol compound. Over the course of the reaction, the reaction mixture comprising the initial organosilicon compound (A), the water (B), and the catalyst (C), and carrier vehicle (when present) comprises increasing amounts of the organosilanol compound and decreasing amounts of (A) and (B). Once the reaction is complete (e.g. one of the initial organosilicon compound (A) or the water (B) is consumed, or no additional organosilanol compound is being prepared), the reaction mixture may be referred to as a reaction product comprising the organosilanol compound. In this fashion, the reaction product typically includes any remaining amounts of starting materials (A), (B), and (C), and solvent (when present), as well as degradation and/or reaction products thereof (e.g. materials which were not previously removed via any purification, e.g., distillation or stripping).

The method described above may further comprise recovering (e.g., isolating and/or purifying) the organosilanol compound from the reaction product. As used herein, recovering the organosilanol compound is typically defined as increasing the relative concentration of the organosilanol compound as compared to other compounds in combination therewith (e.g. in the reaction product or a purified version thereof). As such, as is understood in the art, recovering may comprise removing the other compounds from such a combination (i.e., decreasing the amount of impurities combined with the organosilanol compound, e.g. in the reaction product) and/or removing the organosilanol compound itself from the combination. Any suitable technique and/or protocol for isolation may be utilized. Examples of suitable isolation techniques include distilling, stripping/evaporating, extracting, filtering, washing, partitioning, phase separating, chromatography, and combinations of two or more thereof. As will be understood by those of skill in the art, any of these techniques may be used in combination (e.g., sequentially) with any another technique to recover the organosilanol compound.

Alternatively, isolating the organosilanol compound may comprise distilling and/or stripping volatiles from the reaction product. When a carrier vehicle is utilized, volatiles may be distilled and/or stripped from the reaction mixture comprising the organosilanol compound. Isolating the organosilanol compound may comprise filtering the reaction product to remove remaining amounts of the catalyst (C) and/or solids formed therefrom. In any case (e.g. after removing volatiles and/or solids via stripping/distillation and/or filtration), the reaction product may be referred to as the recovered organosilanol compound.

The method may further comprise purifying the organosilanol compound. Any suitable technique for purification may be utilized. Purifying the organosilanol compound may comprise distillation, to either remove the organosilanol compound (e.g. as a distillate) or to strip other compounds/components therefrom (i.e., leaving the organosilanol compound in the pot as a high-boiling component of the reaction mixture or purified reaction mixture. As will be appreciated by those of skill in the art, distilling the reaction product or purified reaction product to purify and/or isolation the organosilanol compound may be performed at an elevated temperature and a reduced pressure. The elevated temperature and reduced pressure are independently selected, depending on various factors e.g. the particular starting materials used, the particular organosilanol compound prepared, and other isolation/purification techniques utilized, as will be readily determined by those of skill in the art. Alternatively, purifying the organosilanol compound may be defined as purifying the recovered organosilanol compound (e.g. where purification is performed subsequent to isolation of the organosilanol compound).

The method described above produces a branched organosilanol compound. The branched organosilanol compound may comprise a formula selected from the group consisting of:

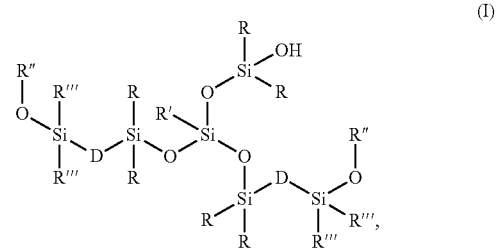

(I)

(II)

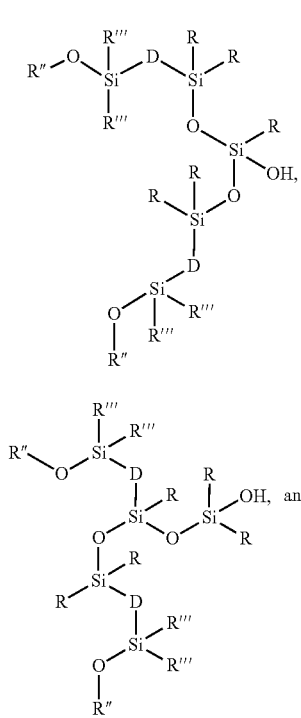

(III)

and (IV) a combination of any two or more of (I), (II), and (III), where R, R', R", R'" and D are as described above.

Alternatively, the branched organosilanol compound may have formula (I). Alternatively, the branched organosilanol compound may have formula (I-1):

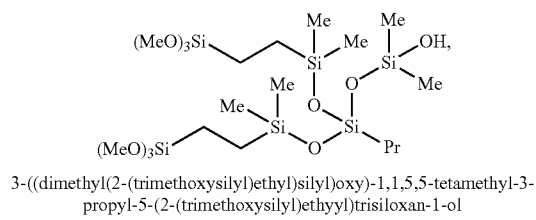

3-((dimethyl(2-(trimethoxysilyl)ethyl)silyl)oxy)-1,1,5,5-tetamethyl-3-propyl-5-(2-(trimethoxysilyl)ethyyl)trisiloxan-1-ol which may be abbreviated PrT EHM-OH (or PrT EHM Silanol), where Me represents methyl, and Pr represents propyl.

Alternatively, the branched organosilanol compound may comprise a combination of formula (II) and formula (III). The compound of formula (II) may be (II-1):

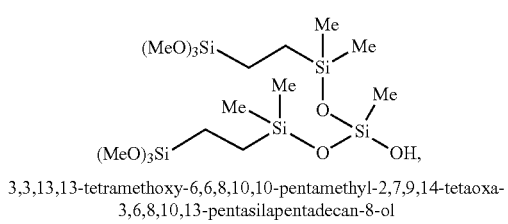

3,3,13,13-tetramethoxy-6,6,8,10,10-pentamethyl-2,7,9,14-tetaoxa-3,6,8,10,13-pentasilapentadecan-8-ol and the compound of formula (III) may be (III-1)

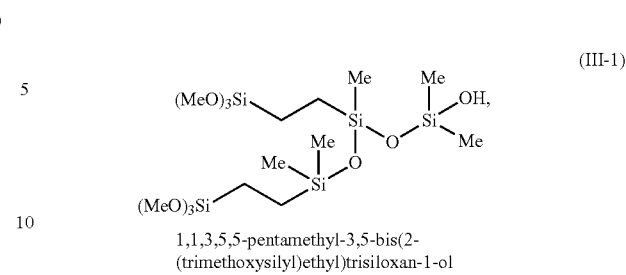

1,1,3,5,5-pentamethyl-3,5-bis(2-(trimethoxysilyl)ethyl)trisiloxan-1-ol where Me represents methyl.

Method of Use

The organosilanol compound described above may be used to functionalize a polymer. For example, in a method for preparing a silicone hybrid copolymer, the improvement may comprise using the organosilanol compound described above to functionalize an organic compound, and thereafter reacting the functionalized organic polymer with a polyorganosiloxane, e.g., by condensation reaction. Alternatively, the organosilanol compound described above may be used to functionalize a polyorganosiloxane, and thereafter the functionalized silicone compound may be reacted with an organic polymer, e.g., by condensation reaction.

Alternatively, the organosilanol compound described above may be used to functionalize a polyorganosiloxane, such as a polyorganosiloxane having silicon bonded hydrogen atoms or silicon bonded alkoxy group. In a method for preparing a functionalized polymer, the improvement may comprise reacting the organosilanol compound as described above with a starting material selected from the group consisting of a polyorganosiloxane having a group capable of reacting with the silanol moiety of the organosilanol compound and/or one or more starting materials for preparing a silicone-organic hybrid copolymer, wherein said one or more starting materials has a group capable of reacting with the silanol moiety of the organosilanol compound.

EXAMPLES

These examples are intended to illustrate the invention and should not be interpreted as limiting the scope set forth in the claims.

In this Example 1, PrT EHM-OH was prepared from PrT EHM converter using [Ir(COD)Cl]$_2$ catalyst, as follows: A 3-neck round bottom (R.B.) flask was charged with PrT EHM converter (10 g) and a solution of [Ir(COD)Cl]$_2$ in toluene (25 mM, 0.57 mL). The system was purged with N$_2$ and heated to 40° C. Water (0.4 g) was dropwise added to the reaction mixture upon stirring over 20 min. After addition, the reaction mixture was allowed to stir at 40° C. for 30 min before stripped under vacuum. The residue was analyzed by GC, and results are shown in FIG. 1. The residue was also analyzed by $^{29}$Si NMR and $^1$H NMR. The results are in FIGS. 2-5.

In this Example 2, PrT EHM-OH was prepared from PrT EHM converter using Pd/C catalyst as follows: To a 50 mL 3 neck 14/20 flask was added tetrahydrofuran (THF) (13 mL), PrT EHM converter (11.86 g, 20 mmol) and Pd/C (5 wt. %, 0.1 mol %, 42 mg, powder). The flask was stirred under nitrogen. Then water (0.47 mL, 26 mmol) was added through a syringe over 5 minutes. Bubbling was observed. GCMS was taken at several points after the water was added. After 161 minutes the reaction was worked up by filtering through a plug of celite, removing the solvent, and drying under high vacuum. The results are shown in FIGS. 6-9.

In this Comparative Example 3, an attempt was made to prepare PrT EHM-OH from PrT EHM converter using dichloro(p-cymene)ruthenium dimer catalyst, as follows: A 3-neck round bottom flask was charged with PrT EHM converter (20 g) and a solution of [Ru(p-cymene)Cl$_2$]$_2$ in THF (7.5 mM, 3.8 mL). The system was purged with N$_2$ and heated to 70° C. Water (0.79 g) was dropwise added to the reaction mixture upon stirring. Gas generation was much slower than the reactions in Examples 1 and 2, above. After 1 h when ⅔ of water was added, the reaction mixture was analyzed by GC. Hydrolysis of Si—OMe, instead of dehydrogenative coupling between Si—H and H$_2$O, seemed to be the predominant reaction. The results are shown in FIG. 10.

INDUSTRIAL APPLICABILITY

The examples and comparative examples show that new branched organosilanol compounds can be prepared using the methods employing the Ir and Pd catalysts described herein.

Definitions and Usage of Terms

The SUMMARY and ABSTRACT are hereby incorporated by reference. Table 1 shows the abbreviations used herein.

TABLE 1

| Abbreviations | |
|---|---|
| Abbreviation | Definition |
| Cr(acac)$_3$ | Chromium acetyl acetonate |
| g | grams |
| GC | Gas chromatography |
| GCMS | Gas chromatography mass spectrometry |
| [Ir(COD)Cl]$_2$ | Bis(1,5-cyclooctadiene)diiridium(I) dichloride CAS No. 12112-67-3 |
| m | meter |
| M | molar |
| Me | methyl |
| mg | milligrams |
| MHz | megaHertz |
| min | minutes |
| mL | milliliters |
| mM | millimolar |
| mm | millimeter |
| mmol | millimole |
| NMR | nuclear magnetic resonance |
| Pr | propyl |
| RT | room temperature of 25° C. ± 5° C. |
| THF | tetrahydrofuran |
| μL | microliter |

NMR. Proton ($^1$H) NMR spectra were recorded on an Agilent 400-MR NMR spectrometer operating at 400 MHz (mi-MR-05). Silicon ($^{29}$Si) NMR spectra were recorded on an Agilent 500 MHz DD2 (mi-MR-06) system with a 16 mm silicon free AutoZ probe. Peak frequencies are recorded in ppm. $^1$H samples were run with 100 μL sample in 1 mL deuterated chloroform (CDCl$_3$), while $^{29}$Si samples were run with 2 mL sample in 3 mL deuterated chloroform with Cr(acac)$_3$.

GC. The chromatographic equipment was a Hewlett Packard 5890 Series II GC equipped with a flame ionization detector and Hewlett Packard 6890 Series Autoinjector. The separation was made with a 30 m HP-5 column, with 78 mL/min helium flow and 1.05 mL/min column flow. The samples were prepared as 100 μL in 1 mL dichloromethane. An injection volume of 2 μL was used, with an injector temperature of 180° C. and a detector temperature of 300° C., and data was collected for 36.33 min. The oven method consisted of holding an initial temperature of 40° C. for 1 min, followed by a ramp of 5° C./min to 150° C., a ramp of 15° C./min to 275° C., ending with holding the final temperature of 275° C. for 5 minutes. The sample was prepared by diluting 100 μL material in 1 mL dichloromethane.

All amounts, ratios, and percentages are by weight unless otherwise indicated. The articles 'a', 'an', and 'the' each refer to one or more, unless otherwise indicated by the context of the specification. The disclosure of ranges includes the range itself and also anything subsumed therein, as well as endpoints. For example, disclosure of a range of 1 to 18 includes not only the range of 1 to 18, but also 1, 2, 3, 4, 6, 12, and 18 individually, as well as any other number subsumed in the range. Furthermore, disclosure of a range of, for example, 1 to 18 includes the subsets of, for example, 1 to 10, 1 to 6, 1 to 4, 1 to 2, 6 to 18, 6 to 12, and 12 to 18, as well as any other subset subsumed in the range. Similarly, the disclosure of Markush groups includes the entire group and also any individual members and subgroups subsumed therein. For example, disclosure of the Markush group a Cl, Br, and I includes the member Br individually; the subgroup Cl and Br; and any other individual member and subgroup subsumed therein.

The invention claimed is:

1. A branched organosilanol compound comprising a formula selected from the group consisting of:

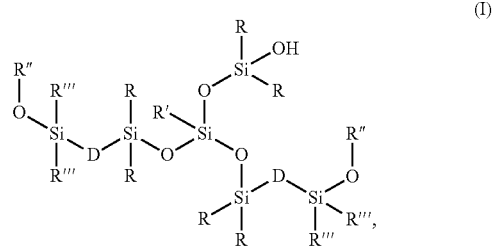

(I)

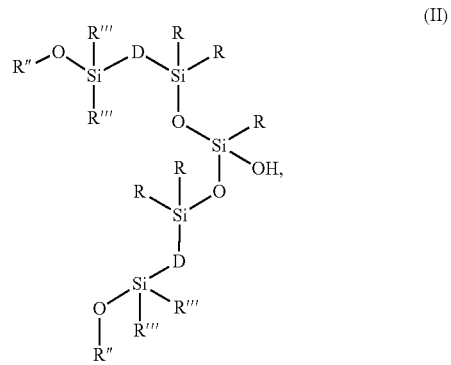

(II)

(III)

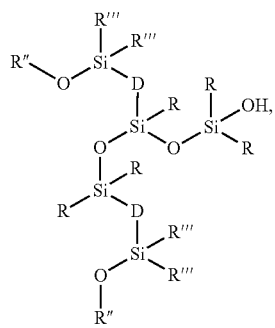

and (IV) a combination of any two or more of (I), (II), and (III), where each R, each R', and each R" is an independently selected monovalent hydrocarbyl group, each R'" is independently selected from the group consisting of R and OR", and each D is an independently selected divalent hydrocarbyl group.

2. The compound of claim 1, where each R is an alkyl group of 1 to 18 carbon atoms or an aryl group of 6 to 18 carbon atoms, each R' is an alkyl group of 1 to 18 carbon atoms, each R" is an alkyl group of 1 to 6 carbon atoms; and at least two of R'" per molecule are OR".

3. The compound of claim 1, where each R'" is OR".

4. The compound of claim 1, where each R is selected from the group consisting methyl and phenyl; each R' is selected from the group consisting of methyl, ethyl, and propyl; each R" is selected from the group consisting of methyl and ethyl; and each R'" is selected from the group consisting of methoxy and ethoxy.

5. The compound of claim 1, where the compound has formula (I).

6. The compound of claim 5, where the compound has formula (I-1):

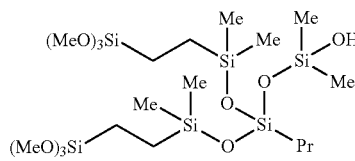

where Me represents methyl, and Pr represents propyl.

7. The compound of claim 1, where the compound comprises a combination of formula (II) and formula (III).

8. The compound of claim 7, where the compound of formula (II) is (II-1)

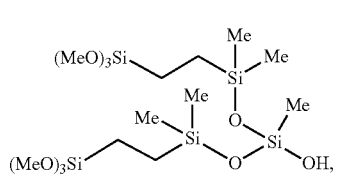

and the compound of formula (III) is (III-1)

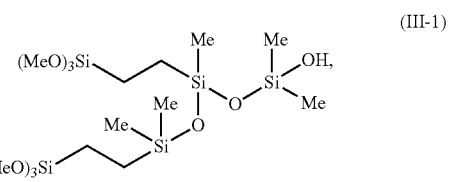

where Me represents methyl.

9. A method of preparing the organosilanol compound of claim 1, said method comprising:
reacting (A) an initial organosilicon compound and (B) water in the presence of (C) a catalyst selected from (C-1) [(C$_8$H$_{12}$)IrX]$_2$, where each X is independently selected from the group consisting of Cl, Br, and I; and (C-2) Pd/C, thereby preparing the organosilanol compound;
wherein the initial organosilicon compound (A) has a formula selected from the group consisting of:

(A-1)

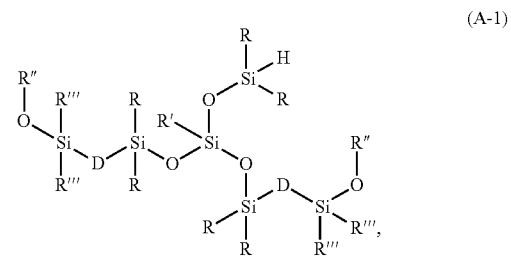

(A-2)

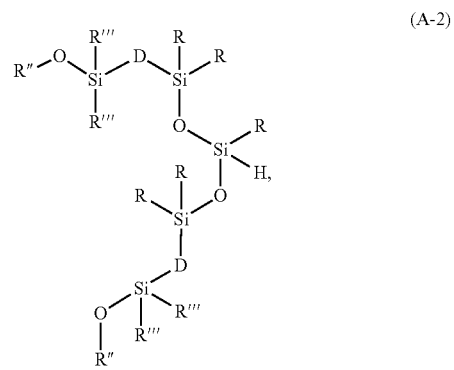

(A-3)

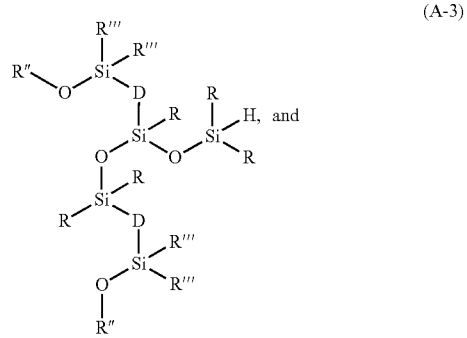

and (A-4) a combination of two or more of (A-1), (A-2), and (A-3), where R, R', R", and R'" are as defined above.

10. The method of claim 9, where (A-1) has formula:

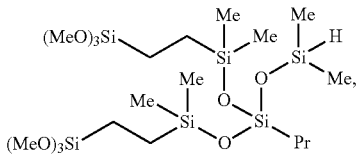

where Me represents methyl, and Pr represents propyl.

11. The method of claim 9, where (A-2) has formula

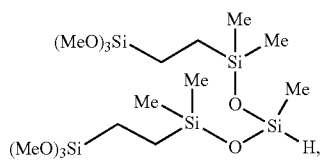

where Me represents methyl.

12. The method of claim 9, where (A-3) has formula

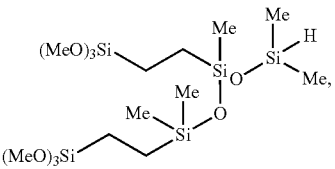

where Me represents methyl.

13. The method of claim 9, where reacting the initial organosilicon compound (A) and water (B) forms a reaction product comprising the branched organosilanol compound, and wherein the method further comprises isolating the branched organosilanol compound from the reaction product.

14. A method for preparing a functionalized polymer comprising reacting the organosilanol compound of claim 1 with a polyorganosiloxane having a group capable of reacting with the silanol moiety of the organosilanol compound.

15. A method for preparing a functionalized polymer comprising reacting the organosilanol compound of claim 1 with one or more starting materials for preparing a silicone-organic hybrid copolymer, wherein said one or more starting materials has a group capable of reacting with the silanol moiety of the organosilanol compound.

* * * * *